(12) United States Patent
Myojo et al.

(10) Patent No.: US 7,792,955 B2
(45) Date of Patent: Sep. 7, 2010

(54) COMMUNICATION APPARATUS AND COMMUNICATION CONTROL METHOD

(75) Inventors: Toshihiko Myojo, Yokohama (JP); Tatsuhiko Sakai, Nakano-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1140 days.

(21) Appl. No.: 11/298,424

(22) Filed: Dec. 8, 2005

(65) Prior Publication Data
US 2006/0126531 A1    Jun. 15, 2006

(30) Foreign Application Priority Data
Dec. 10, 2004  (JP) .............................. 2004-359125
Dec. 10, 2004  (JP) .............................. 2004-359126

(51) Int. Cl.
*H04W 24/00*  (2009.01)
*G06F 15/16*  (2006.01)

(52) U.S. Cl. ...................... 709/224; 709/227; 455/456.1

(58) Field of Classification Search ................. 709/227; 455/456
See application file for complete search history.

(56) References Cited

U.S. PATENT DOCUMENTS

| | | | | |
|---|---|---|---|---|
| 6,026,297 | A * | 2/2000 | Haartsen ................. | 455/426.1 |
| 6,700,893 | B1 * | 3/2004 | Radha et al. ............. | 370/412 |
| 6,801,776 | B2 | 10/2004 | Notani et al. | |
| 7,024,482 | B2 * | 4/2006 | Hlasny ................... | 709/227 |
| 7,145,871 | B2 * | 12/2006 | Levy et al. .............. | 370/229 |
| 2002/0147816 | A1 * | 10/2002 | Hlasny ................... | 709/227 |
| 2002/0181439 | A1 * | 12/2002 | Orihashi et al. ......... | 370/350 |
| 2003/0088682 | A1 | 5/2003 | Hlasny | |
| 2004/0147267 | A1 * | 7/2004 | Hill et al. ................ | 455/456.1 |
| 2005/0136835 | A1 * | 6/2005 | Suwa ..................... | 455/11.1 |
| 2007/0047446 | A1 * | 3/2007 | Dalal et al. .............. | 370/237 |

FOREIGN PATENT DOCUMENTS

| | | |
|---|---|---|
| JP | 2001-218255 A | 8/2001 |
| JP | 2003-218881 A | 7/2003 |
| JP | 2004-511140 A | 4/2004 |
| JP | 2004-194324 A | 7/2004 |
| WO | WO 02/28118 | 4/2002 |

OTHER PUBLICATIONS

European Search Report dated Mar. 2, 2006.

(Continued)

*Primary Examiner*—George C Neurauter, Jr.
*Assistant Examiner*—Anish Sikri
(74) *Attorney, Agent, or Firm*—Cowan, Liebowitz & Latman, P.C.

(57) ABSTRACT

The claimed invention is directed to a communication apparatus which comprises a monitor unit that monitors communication conditions with a plurality of networks; a setting unit that performs adjusting and setting a communication timing to communicate with each of the plurality of networks in accordance with the communication condition of each network and notifying the plurality of networks of information about the set communication timings; and a communication unit that switches communication to each of the plurality of networks on the basis of the setting of the communication timings, wherein said setting unit dynamically changes the communication timing on the basis of the communication condition monitored by said monitor unit.

16 Claims, 11 Drawing Sheets

OTHER PUBLICATIONS

Communication from European Patent Office dated Mar. 10, 2006.
"Technology Kaitaishinsho Bluetooth™ Technical Interpretation Guide" edited by Japan Ericsson, Written by Kazuhiro Miyazu, RIC Telecom. Jun. 11, 2001, pp. 21, 22, 39-41, 45-47, 181-186.

The above reference was cited in a Jun. 5, 2009 Japanese Office Action that issued in Japanese Patent Application No. 2004-359126, which is enclosed without English Translation.

* cited by examiner

| STATE | COMMUNICATION HOLD TIME LENGTH L |
|---|---|
| Print_Printing | 0.01 |
| Print_Idle | 0.95 |
| Print_Buffer_full | 0.95 |
| Print_Error | 0.95 |
| FTP_Transfer | 0.01 |
| FTP_Idle | 0.95 |
| FTP_Error | 0.95 |

FIG. 6B

| PROCESS ID | OPERATION STATE | COMMUNICATION HOLD TIME LENGTH | COMMUNICATION HOLD TIME PERIOD | HOLD-START TIME |
|---|---|---|---|---|
| | | | | |

| TERMINAL ID | DATA TYPE | COMMUNICATION HOLD TIME LENGTH L |
|---|---|---|
| 11.11.22.33.44.00 | MPEG file | 0.2 |
| | Thumbnail file | 0.45 |
| | DOC file | 0.01 |
| | Null data | 0.95 |
| 11.11.22.33.44.55 | PRINT DATA | 0.01 |
| | STATUS SIGNAL | 0.95 |
| | Null data | 0.95 |

| TERMINAL ID | DATA TYPE | COMMUNICATION HOLD TIME LENGTH | COMMUNICATION HOLD TIME PERIOD | HOLD-START TIME |
|---|---|---|---|---|
| 11.11.22.33.44.00 | | | 1 | |
| 11.11.22.33.44.55 | | | 1 | |

COMMUNICATION APPARATUS AND COMMUNICATION CONTROL METHOD

FIELD OF THE INVENTION

The present invention relates to, e.g., a communication apparatus and control method thereof and, more particularly, to a scheme of causing a communication apparatus which communicates with a plurality of networks to adjust the participation time in each network in accordance with the communication environment or communication condition of each network.

BACKGROUND OF THE INVENTION

In Bluetooth®, a network is formed from a master which executes polling control to control the communication timing and access of a communication device and a slave which executes communication in accordance with a signal from the master. A piconet can be formed by one master and seven slaves at maximum.

In Bluetooth®, a scatternet which participates and communicates in a plurality of piconets is defined. For example, when a communication device connected to an access point (first piconet) wants to participate in another piconet (e.g., a second piconet to a communication device such as a PC), the communication mode to the master (the access point in this case) which controls the first piconet is temporarily changed to a power saving mode for intermittent reception. With this processing, connection to the access point is temporarily opened so that communication can be executed at the communication timing of the second piconet.

In the piconet operation of Bluetooth®, communication devices (slaves) communicate with each other through the master that controls access timing. For this reason, traffic in the radio section increases, and no efficient data transfer can be done. Even in the scatternet operation described in the prior art as a means for avoiding this problem, since a clock frequency shift occurs between masters, the initially set access time cannot be ensured. This is because the access timing to a specific slave device (to be referred to as a slave 1 hereinafter) is controlled in accordance with the timing of the power saving mode set with respect to a master which operates asynchronously.

When communication traffic to the slave 1 changes, and the communication time to one master is to be changed, the power saving mode shift time must be reset between the slave 1 and each master. It is therefore difficult to sequentially adapt the access time in accordance with a change in traffic. To solve this problem, a method has been examined in Bluetooth SIG, in which a slave which participates in a plurality of piconets is caused to notify each master of the time (communication hold time) of nonparticipation in the piconet. However, how to notify the master of the communication hold time is not disclosed. It is hard to perform access control according to the communication condition such as traffic.

As described above, in the communication scheme that allows one communication apparatus to belong to a plurality of networks simultaneously, the timing to permit the communication apparatus to access each network or the timing to inhibit access must be adjusted, though the adjustment is difficult.

SUMMARY OF THE INVENTION

The present invention has been made in consideration of the above-described prior art, and has as its object to provide a communication apparatus which belongs to a plurality of networks simultaneously and can adjust the band of each network in accordance with the communication condition such as the data type, data amount, or traffic amount of communication or the control state of a partner device whereby communication resources can appropriately be distributed to the networks and efficiently be used so that the communication time can be shortened, and the productivity of data exchange can be improved.

It is another object of the present invention to provide a communication apparatus which can reliably communicate with each network in accordance with the state of an application using communication and set the communication hold time for each terminal so that communication can always be done with a terminal of any one of the networks.

The present invention has been made in consideration of the above-described prior art, and has the following arrangement. More specifically, there is provided a communication apparatus characterized by comprising a monitor unit which monitors communication conditions with a plurality of networks, a setting unit which adjusts and sets a communication timing to communicate with each of the plurality of networks in accordance with the communication condition of each network and notifies the plurality of networks of information about the set communication timings, and a communication unit which switches communication to each of the plurality of networks on the basis of the setting of the communication timings, wherein the setting unit dynamically changes the communication timing on the basis of the communication condition monitored by the monitor unit.

There is also provided a communication apparatus characterized by comprising a setting unit which adjusts and sets a communication hold time to inhibit communication with each of a plurality of networks in accordance with a state of an application program to communicate with one of the plurality of networks, a notification unit which notifies each of the plurality of networks of the communication hold time set by the setting unit, and a stop unit which stops communication with the plurality of networks on the basis of the setting of the communication hold time, wherein the setting unit sets the communication hold time of each network without any overlap of the communication hold times of the plurality of networks and any overlap of communication participation times of the plurality of networks.

According to the present invention, the communication apparatus belonging to the plurality of networks simultaneously can adjust the band of each network in accordance with the communication condition such as the data type, data amount, traffic, or the control state of a partner device in communication. For this reason, communication resources can appropriately be distributed to the networks and efficiently be used so that the communication time can be shortened, and the productivity of data exchange can be improved.

Furthermore, the communication apparatus simultaneously belonging to the plurality of networks according to the present invention can reliably communicate with each network in accordance with the state of an application using communication and set the communication hold time for each terminal so that communication can always be done with a terminal of any one of the networks.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6A is a view showing an example of an operation state table according to the first embodiment;

FIG. 6B is a view showing an example of a communication hold parameter table according to the first embodiment;

FIG. 9A is a view showing an example of an operation state table according to the second embodiment; and FIG. 9B is a view showing an example of a communication hold parameter table according to the second embodiment.

DETAILED DESCRIPTION OF THE PREFERRED EMBODIMENTS

First Embodiment

Figure 1:
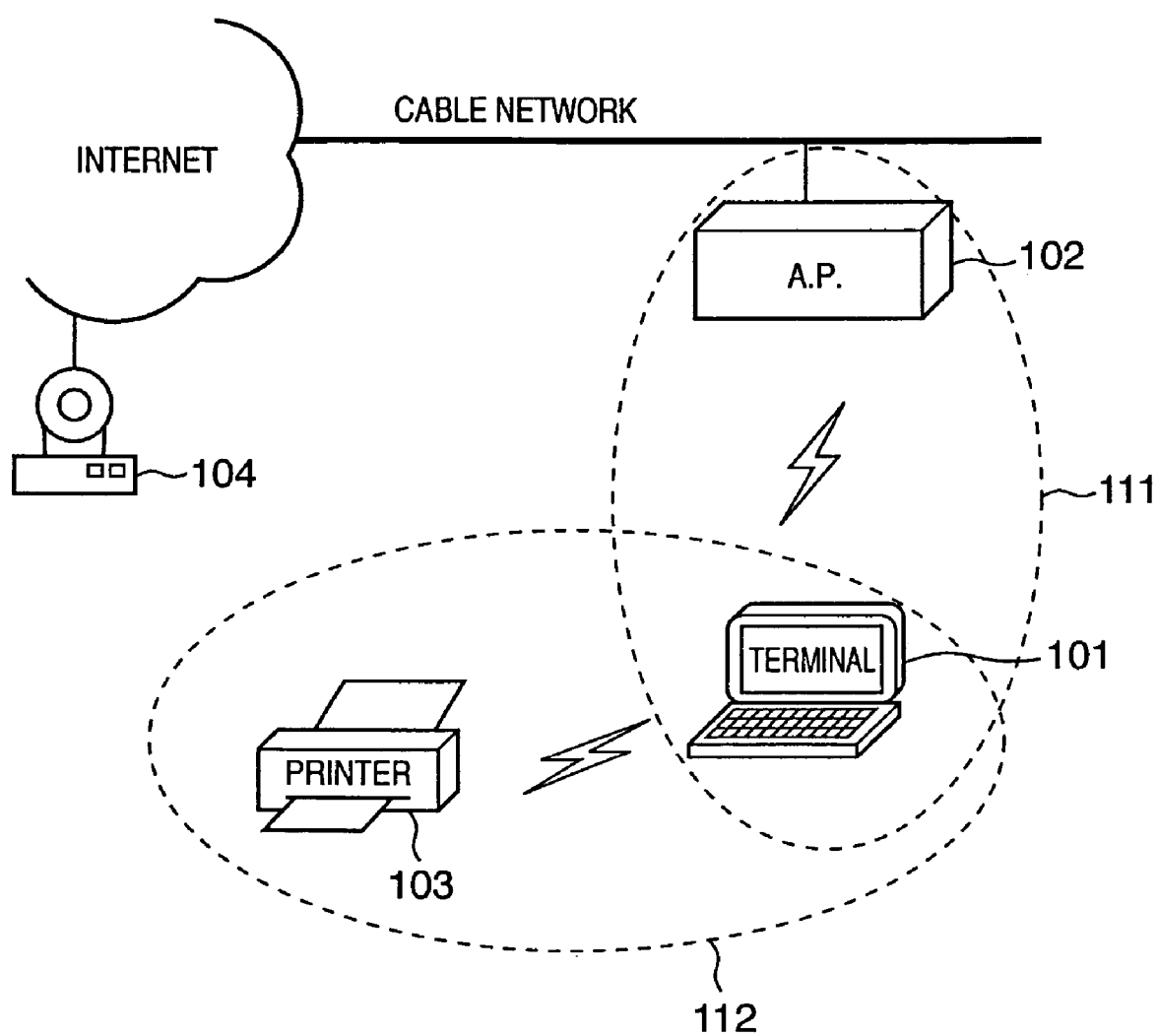
FIG. 1 is a view showing an example of an embodiment of the present invention.

The first embodiment of the present invention will be described below with reference to the accompanying drawings. FIG. 1 is a view showing an information terminal 101, access point 102, and printer 103 according to an embodiment of the present invention. In this embodiment, the information terminal 101 is connected to the access point 102 by using Bluetooth®, i.e., a local radio commutation scheme, thereby using an application such as FTP or Web access through the cable network in which the access point 102 participates. The information terminal 101 is also connected to the printer 103 by using Bluetooth® so that print data in the information terminal 101 is transferred to the printer 103 and printed. In the first and second embodiments, Bluetooth® is used as the radio communication scheme. However, any other communication scheme can be used if it implements simultaneous participation in a plurality of networks by switching the network to communicate by time division control.

<Outline of First Embodiment>

In this embodiment, in a piconet 111 including the access point 102 and information terminal 101, the access point 102 serves as a master terminal, i.e., the control entity of the piconet to cope with access from another device, and the information terminal 101 serves as a slave terminal. In a piconet 112 including the printer 103 and information terminal 101, the terminal 101 serves as a master terminal, i.e., the control entity of the piconet to cope with access from another device, and the printer 103 serves as a slave terminal. When the information terminal 101 communicates with both the access point 102 and the printer 103, the information terminal 101, access point 102, and printer 103 form a scatternet so that the two piconets can share the information terminal 101. In this embodiment, for more reliable communication with each terminal, the information terminal 101 controls the communication timing by notifying each terminal of a communication hold time.

The information terminal 101 executes an FTP client application to execute FTP communication with a server on the cable network through the access point 102 and a print application program (to be abbreviated as an application hereinafter) to execute print processing of the printer 103. In this embodiment, the information terminal 101 monitors the operation states of these applications. Communication is performed while optimizing the communication resources of the information terminal 101 by appropriately setting communication hold times to be given to the access point 102 and printer 103 in accordance with the state change of each application and notifying the terminals of the set times.

<Arrangement of Information Terminal>

Figure 2:
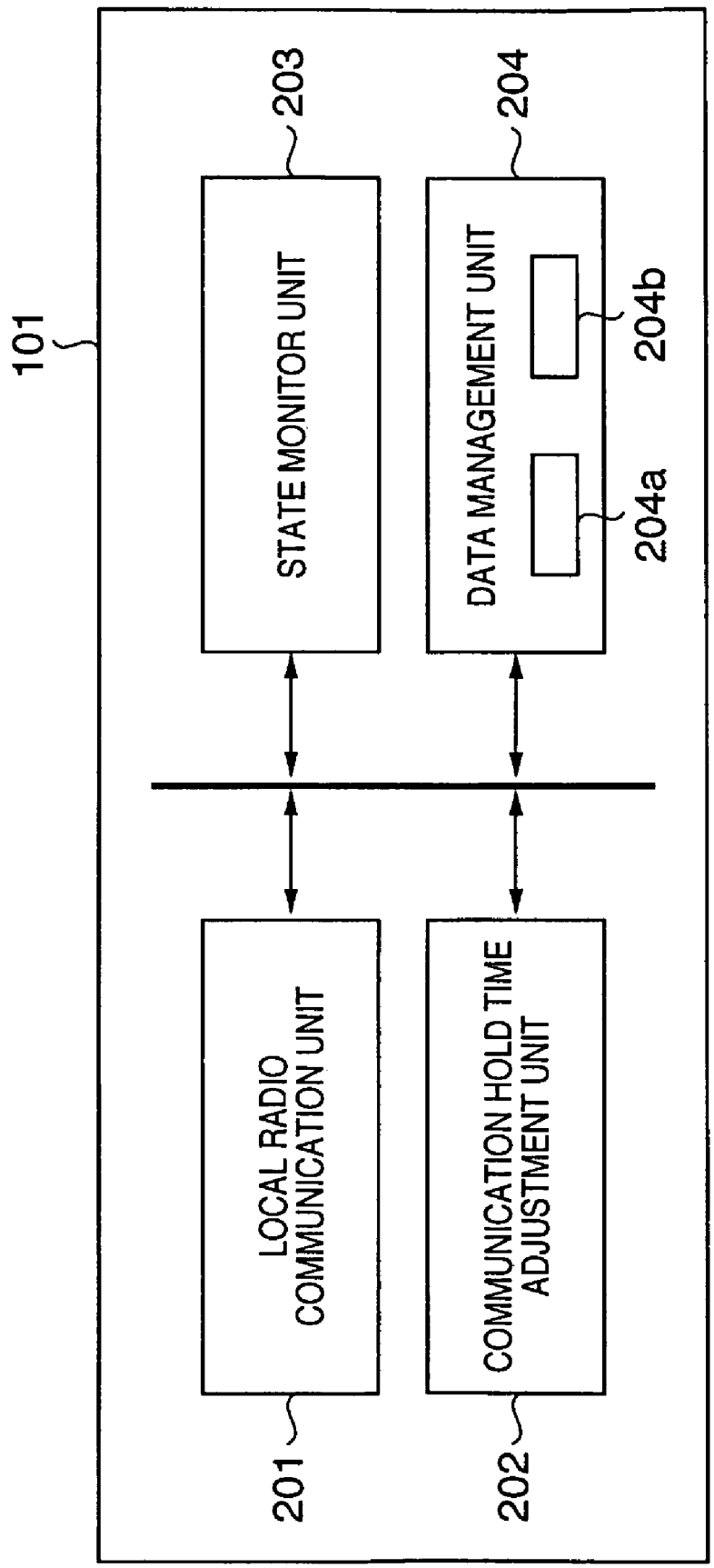
FIG. 2 is a block diagram showing the functional blocks of an information terminal according to the first embodiment.

The arrangement of the information terminal 101 according to this embodiment will be described with reference to the functional block diagram shown in FIG. 2. The information terminal 101 comprises at least a local radio communication unit 201, communication hold time adjustment unit 202, state monitor unit 203, and data management unit 204. These constituent elements are implemented by the hardware configuration of a general-purpose computer capable of executing the above-described applications, communication hardware capable of implementing Bluetooth®, and software to be executed by the computer. The local radio communication unit 201 has a function of executing radio communication with peripheral terminals by using a local radio communication scheme (Bluetooth® in this embodiment). The communication hold time adjustment unit 202 has a function of adjusting the communication hold time of each piconet in executing communication by the scatternet. The state monitor unit 203 has a function of monitoring the state of each application which runs on the information terminal 101 and uses communication by the scatternet. The data management unit 204 has a function of managing information necessary for communication control by the scatternet in, e.g., an operation state definition table 204a and communication hold parameter table 204b. The operation state definition table 204a defines the association between the operation state of each application and the length of the communication hold time. The communication hold parameter table 204b stores the operation state of a currently executed application, corresponding communication hold time, communication hold time period, and hold start time in association with each other. The communication hold parameter table 204b is created for each application. FIG. 6A shows an example of the operation state definition table 204a.

<Communication Control Procedures>

Figure 3:
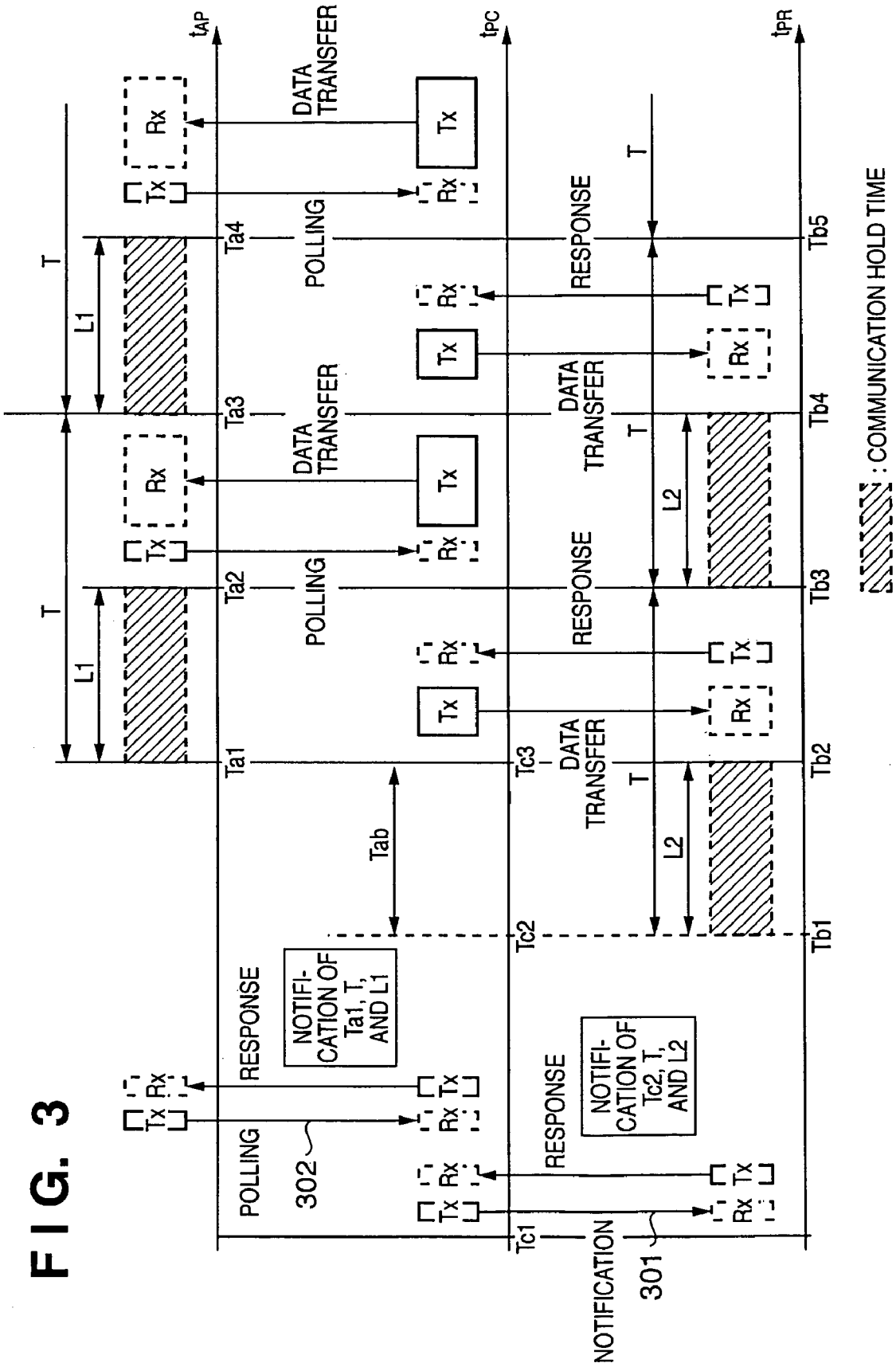
FIG. 3 is a timing chart showing an example of communication processing procedures of a scatternet according to the first embodiment.

The communication processing procedures by the information terminal 101 in the scatternet formed with respect to the access point 102 and printer 103 will be described next with reference to FIG. 3. In FIG. 3, the flow of data transmitted/received in forming the scatternet between the information terminal 101, the access point 102, and the printer 103 is shown along time axes ($t_{AP}$, $t_{PC}$, and $t_{PR}$) based on the Bluetooth® clocks of the terminals.

In forming the scatternet, the information terminal 101 notifies the access point 102 and printer 103 of communication hold times in a period Tc1-Tc2. A notification of communication hold time contains a hold start time (Ta1 and Tb1 for the respective networks), communication hold time period T, and communication hold time length L (L1 and L2 for the respective networks).

The hold start time is a value which gives the timing to start the communication hold time. The hold start time is given as, e.g., the Bluetooth clock value of the master terminal in the piconet at the timing to start the communication hold time. In the piconet 111, the information terminal 101 is a slave. Hence, the information terminal 101 executes notification by, e.g., converting the Bluetooth clock of its own into a master clock value shifted by the clock offset value in the piconet 111.

The communication hold time period T is a value which gives the period from the start of one communication hold time to the start of the next communication hold time as the number of slots. In this embodiment, the communication hold time periods T are equal in the plurality of piconets (i.e., networks). If the period T changes between the piconets, slots assigned to the networks overlap due to the phase shift of the communication hold time, and time division multiplex cannot be implemented.

The communication hold time length L is a value which gives the length of one communication hold time as the number of slots. The communication hold time length L is determined by the information terminal 101 such that all the following conditions are satisfied. (1) The sum of communication hold time lengths of the terminals equals the communication hold time period T. (2) One of the terminals is in the communication hold time at any timing of the communication hold time period T.

Referring to FIG. 3, the sum of the communication hold time length L1 of the access point 102 and the communication hold time length L2 of the printer 103, which are determined by the information terminal 101, equals the communication hold time period T. In addition, the start of one communication hold time synchronizes with the end of the other communication hold time. In FIG. 3, L1 and L2 are assigned to divide T into two equal parts.

On the basis of the notifications of communication hold time determined under the above-described conditions, the information terminal 101 notifies the access point 102 of the hold start time Ta1, communication hold time period T, and communication hold time length L1 and the printer 103 of the hold start time Tb1, communication hold time period T, and communication hold time length L2.

Upon receiving the notifications of communication hold time, the access point 102 and printer 103 stop communication with the information terminal 101 in accordance with the parameters designated by the notifications. During the communication hold time of one terminal (one of the access point 102 and printer 103), the information terminal 101 communicates with the other terminal.

In this embodiment, the communication hold time lengths L1 and L2 are assigned to divide the communication hold time period T into two equal parts in forming the scatternet. The communication hold time lengths L1 and L2 may be assigned in accordance with a parameter such as the type of device class of the partner terminal, which can be known at the start of communication with each terminal. For example, when communication with a new communication device is established during communication with the access point, and the device class of the new communication device is determined as a printer which requires high traffic, 80% of T is assigned to L1, and 20% of T is assigned to L2. Alternatively, the communication condition to an already communicating device may be confirmed in forming the scatternet, and the assignment ratio of L1 and L2 may be changed in accordance with the condition. For example, if communication with a new communication device (e.g., PC) is established during high-traffic communication by the access point and FTP, 70% of the communication hold time period T is assigned to the access point, and 30% of T is assigned to the PC. These methods can be implemented by registering, in a table, a communication hold time period (a ratio to the communication hold time period) associated with, e.g., each device class or the number of channels (slots) occupied by each device in advance and determining each communication hold time length by looking up the table. If the sum of ratios is not 1, the communication hold time period is divided in accordance with the ratio of communication hold time length corresponding to each device. With the above-described procedures, the information terminal 101 communicates with the access point 102 and printer 103 by the scatternet.

<Changing Communication Hold Time>

The procedures of communication hold time change processing by the information terminal 101 during communication by the scatternet will be described next with reference to FIG. 4. The communication hold time change processing is triggered by the start of communication by the scatternet.

In step S401, the state monitor unit 203 of the information terminal 101 collects the operation state of an application using communication by the scatternet. In this step, the state monitor unit 203 can collect the operation state either by periodically issuing a state request to the application or by causing the application to notify the state monitor unit 203 of, e.g., the start of communication.

In step S402, the information terminal 101 compares the operation state collected in step S401 with an operation state precedingly collected and stored in the communication hold parameter table 204*b* of the data management unit 204 to determine whether the application state has changed. In the communication hold parameter table 204*b*, an item is registered for each process ID. Hence, operation states are compared for an item (i.e., application) whose process ID coincides with that of the application. If it is determined by comparison that the operation state has changed, the collected operation state is stored (updated) in the communication hold parameter table 204*b* of the data management unit 204, and the flow advances to step S403. Otherwise, the flow returns to step S401.

In step S403, the information terminal 101 executes communication hold time adjustment processing of determining new communication hold times of the access point 102 and printer 103. The communication hold time adjustment processing will be described later in detail with reference to FIG. 5.

In step S404, the information terminal 101 executes communication hold time notification processing of notifying the access point 102 and printer 103 of the new communication hold times determined in step S403. The communication hold time notification processing will be described later in detail with reference to FIG. 7. After notifying each terminal of the communication hold time in this step, the flow returns to step S401 to monitor the operation state of the application. With the above-described procedures, the communication hold time is changed.

<Adjustment of Communication Hold Time>

Figure 5:
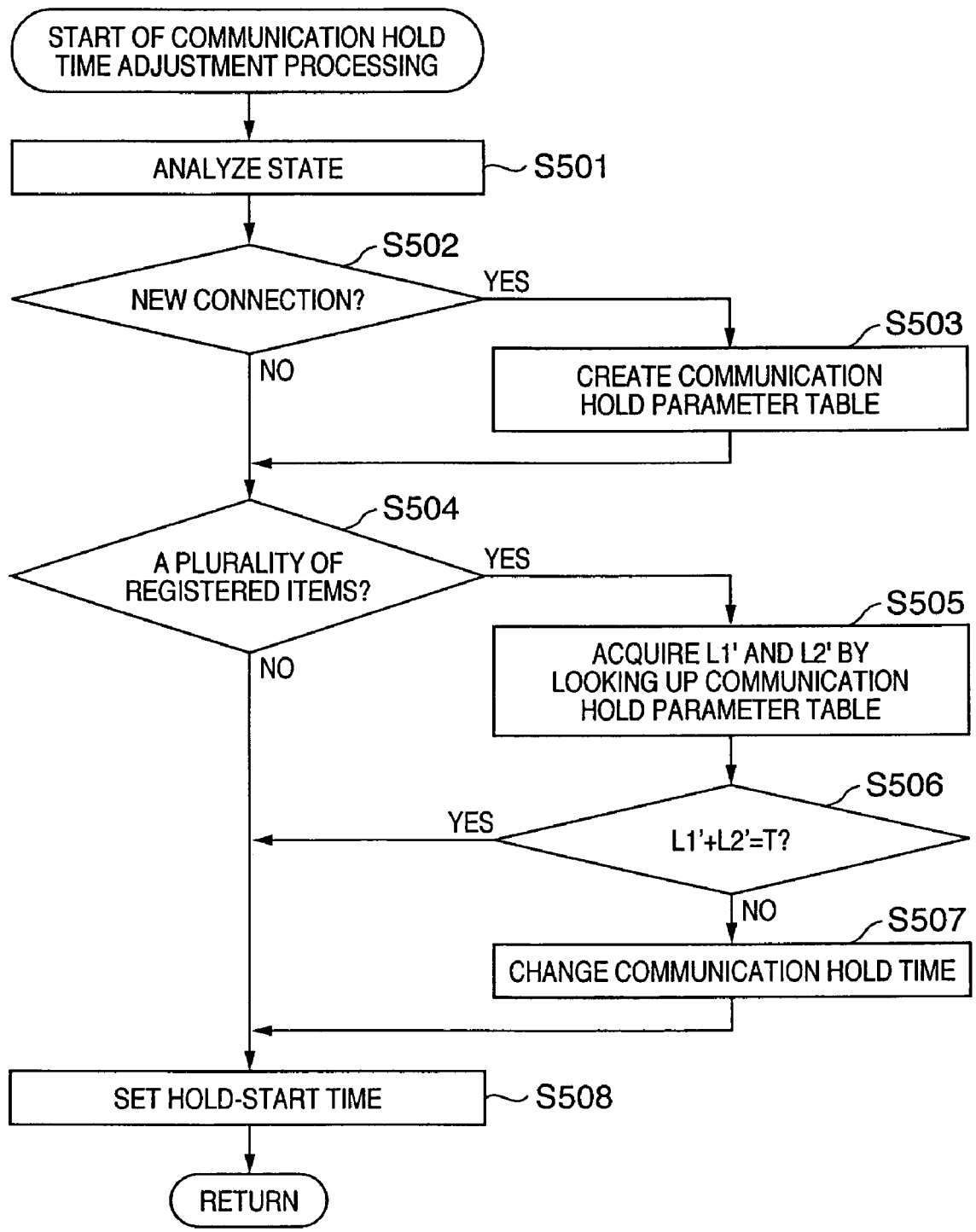
FIG. 5 is a flowchart showing communication hold time adjustment processing procedures according to the first embodiment.

The procedures of communication hold time adjustment processing (step S403) by the information terminal 101 will be described next with reference to FIG. 5. In step S501, the communication hold time adjustment unit 202 acquires the operation state of the application with a change in its operation state from the communication hold parameter table 204*b* of the data management unit 204 and analyzes the state. In step S202, the communication hold time adjustment unit 202 determines whether the operation state is new connection to the network, i.e., the start of communication. If YES in step S502, the flow advances to step S503. Otherwise, the flow advances to step S504.

In step S503, the communication hold time adjustment unit 202 creates the communication hold parameter table 204b related to the application by registering the process ID of the application in the communication start state in the communication hold parameter table 204b as an operating application. In addition, the communication hold time length L corresponding to the current application operation state is registered in the communication hold parameter table 204b in association with the process ID of the operating application. The communication hold parameter table 204b also stores other parameters (communication hold time period and hold start time) of the communication hold time. These parameters are set in step S508. The correspondence between the current application operation state and the communication hold time length L is defined in the operation state definition table 204a (FIG. 6A). The operation state definition table 204a can be prepared for each application using communication. Alternatively, operation states available in various applications (the application using the printer and the FTP application in FIG. 6A) may be put in one table, as shown in FIG. 6A, such that the applications can share the operation state definition table 204a.

FIGS. 6A and 6B show examples of the operation state definition table 204a and communication hold parameter table 204b, respectively. In the operation state definition table 204a, the value of the communication hold time length L is registered as a ratio to the communication hold time period T which is defined as 1. When the operation state of, e.g., the print application of this embodiment is "printing (Print_Printing)", the communication hold time length L is registered as 0.01 because a communication band as wide as possible is preferably obtained. In a state such as "print job wait (Print_Idle)", "receiving-side buffer busy (Print_Buffer_Full)", or "printer error (Print_Error)", the print application only needs to ensure a communication band to transmit/receive the printer state or command without print data communication. Hence, the communication hold time length L is registered as 0.95. Similarly, when the operation state of the FTP client application of this embodiment is "file transfer (FTP_Transfer)", the communication hold time length L is registered as 0.01 because a communication band as wide as possible is preferably obtained. In a state such as "transfer file wait (FTP_Idle)" or "file transfer error (FTP_Error)", the FTP client application only needs to ensure a communication band to transmit/receive a command. Hence, the communication hold time length L is registered as 0.95. The operation state definition table 204a is prepared in the data management unit 204 in advance before the information terminal 101 executes the applications.

In this embodiment, one application uses one network. However, if the information terminal 101 supports multitasking, a plurality of applications which are being executed simultaneously may use one network. In this case, a slot assigned to one network is shared by applications which use the network and are executed in parallel. To do this, the sum of communication participation times (=1−communication hold time) of the plurality of applications using the same network is obtained. A value obtained by subtracting the sum from the communication hold time period (=1) is registered in the communication hold parameter table as a total communication hold time length. If the obtained sum is equal to or smaller than a predetermined minimum value, the minimum value is registered. For example, when two applications use the same network, let La and Lb be the communication hold time lengths. If (La+Lb−1)>minimum value, the resultant value is registered in the communication hold parameter table 204b as the communication hold time length associated with the two applications. Otherwise, the minimum value is registered. This is a mere example, as a matter of course.

In step S504, it is determined whether a plurality of items (an item corresponds to one process ID) are registered in the communication hold parameter table 204b. The plurality of items correspond to the applications which use different networks. If NO in step S504, the flow advances to step S508 to register the hold start time in the communication hold parameter table 204b. In this case, since the communication hold time of each network need not be adjusted, an appropriate time can be set as the hold start time. The communication hold time period T is also set at this time. This value can be a predetermined value.

If YES in step S504 (i.e., when an already registered item is present at the time of new registration, or when the application state has changed, a plurality of items had already been registered), all the registered communication hold time lengths L (L1' and L2' in FIG. 5) are read out by looking up the communication hold parameter table 204b. In step S506, it is determined whether the sum of communication hold time lengths equals the communication hold time period T (normalized to 1 in this example). If NO in step S506, the flow advances to step S507 to adjust the communication hold time.

In step S507, the communication hold time adjustment unit 202 changes the communication hold time length such that the sum of communication hold time lengths equals 1. In FIG. 5, the communication hold time length is changed such that the sum of the communication hold time lengths L1' and L2' equals 1.

Figure 7:
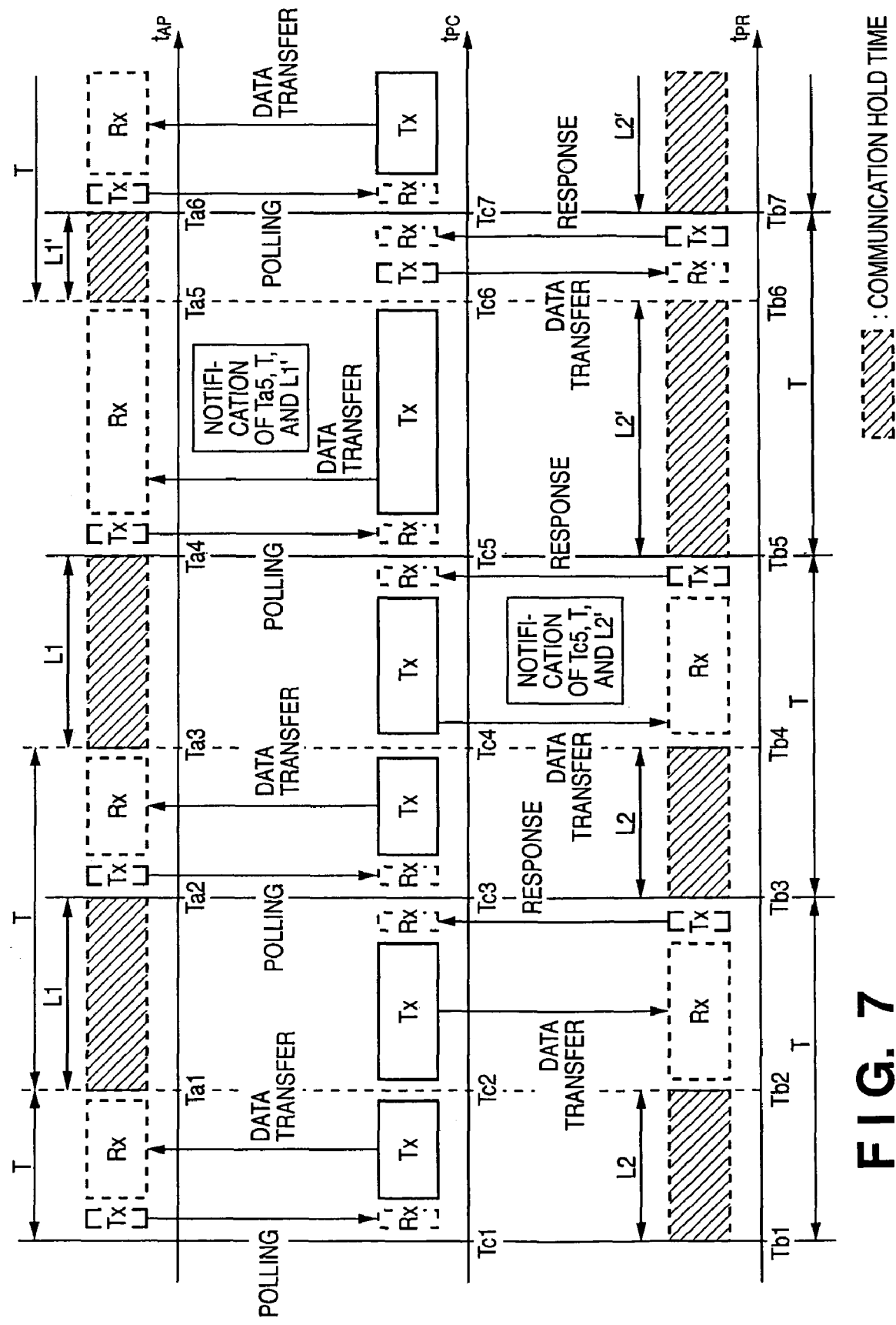
FIG. 7 is a timing chart showing an example of communication hold time notification processing procedures according to the first embodiment.

In step S508, the hold start time is registered in the communication hold parameter table 204b. In this embodiment, the end of one communication hold time synchronizes with the start of the other communication hold time, as shown in FIG. 3 or 7. For this reason, when the hold start time Tb1 is appropriately defined for one network, a value obtained by adding the corresponding communication hold time length L2 to the hold start time Tb1 is set as the hold start time Ta1 of the other network. The communication hold time period is T which is common to both networks. The value registered in the communication hold parameter table may be registered as a value obtained by normalizing the communication hold time period T. In this case, the communication hold time parameter to be transmitted to each terminal must be converted into a Bluetooth clock. In this case, since the communication hold time period T is 1, conversion can be done by multiplying the value of the Bluetooth clock of T. This value may be registered in the communication hold parameter table. After that, communication hold time notification processing is activated in step S404 in FIG. 4 to transfer the hold start time, communication hold time period, and communication hold time length as the changed communication hold time parameters to request the communication hold time notification processing, thereby ending the communication hold time adjustment processing.

The communication hold time adjustment processing in step S403 will be described in detail. For example, assume that the operation state of the print application changes from "print job wait (Print_Idle)" to "printing (Print_Printing)", and the operation state of the FTP client application is "transfer file wait (FTP_Idle)". In this case, in the communication hold time adjustment processing, the communication hold time adjustment unit 202 sets the new communication hold time length L2' of the printer 103 to 0.95 in step S503 by looking up the operation state definition table 204a. The communication hold time length L1' of the access point 102 is kept unchanged at 0.01 because the state does not change.

Since the sum of L1' and L2' is smaller than 1 in step S506, the flow advances to step S507 to change the value L1' to 0.05 so that the sum of the communication hold time lengths L1' and L2' equals 1. In step S508, the communication hold time adjustment unit 202 sets new hold start times for the access point 102 and printer 103 on the basis of the set communication hold time lengths L1' and L2' under a condition that one of the terminals is in the communication hold time at any timing of the communication hold time period T and transfers the new communication hold time parameters of the terminals to the communication hold time notification processing. In step S507 of the above-described detailed example, the value L1' is changed in accordance with the set value "0.95" of L2'. Instead, the value L2' may be changed to 0.99 in accordance with the set value "0.01" of L1'. Alternatively, the value L1' may be changed to, e.g., 0.03, and the value L2' may be changed to 0.97. If one of the values is to be changed, the value to be changed may be determined in advance, or a larger one of the values may be changed. With the above-described procedures, the communication hold time is adjusted.

<Another Example of Reference of Adjustment>

In adjusting the communication hold time, when the communication hold time length of a network is prolonged, the band of that network becomes narrow. Hence, the network whose band should be narrowed can be determined on the basis of, e.g., a Bluetooth profile to be used. The Bluetooth profile is a protocol defined for each device, including a moving image reproduction profile, audio reproduction profile, printing profile, and general-purpose profile. When a moving image reproduction profile or audio reproduction profile is used, communication using that profile requires a predetermined band or more to reproduce the content. Hence, once the communication hold time length is defined in accordance with the data type or profile type, it is undesirable to prolong the communication hold time length in the communication hold time length adjustment in step S508. This is because a narrower band may cause interruption of reproduction. Even in a printing profile using an electrophotographic printer, buffer underrun may occur to lead to interruption of printing because of a large data amount unless a predetermined band is ensured.

To prevent this, when a profile for a device requiring a guaranteed band, e.g., a moving image reproduction profile, audio reproduction profile, or printing profile is used, the communication hold time length of the other network is adjusted not to prolong the communication hold time length of the network where the profile is used.

<Notification of Communication Hold Time>

The procedures of communication hold time notification processing by the information terminal 101 will be described next with reference to FIG. 7. In FIG. 7, the flow of data transmitted/received when the communication hold time is changed during communication by the scatternet between the information terminal 101, the access point 102, and the printer 103 is shown along time axes ($t_{AP}$, $t_{PC}$, and $t_{PR}$) based on the Bluetooth clocks of the terminals. Referring to FIG. 7, the information terminal 101 notifies the access point 102 of the communication hold time L1 and the printer 103 of the communication hold time L2. The information terminal 101 executes communication by the scatternet by communicating with one terminal during the communication hold time of the other terminal.

The operation state of the printer changes, and the communication hold time of the printer 103 is changed by communication hold time adjustment processing in a period Tc4-Tc5, the information terminal 101 notifies the printer 103 of a hold start time Tc5, the communication hold time period T, and the communication hold time length L2' by looking up the communication hold parameter table 204b which is set for the printer 103 by communication hold time adjustment processing in the period Tc4-Tc5.

Similarly, the information terminal 101 gives a new communication hold time to the access point 102 by notifying the access point 102 of a hold start time Ta5, the communication hold time period T, and the communication hold time length L1' in a period Tc5-Tc6 as the next period of communication with the access point 102 after the new communication hold time notification to the printer 103.

Upon receiving the new communication hold time notifications from the information terminal 101, the access point 102 and printer 103 stop communication with the information terminal 101 in accordance with the parameters designated by the notifications. During the communication hold time of one terminal, the information terminal 101 communicates with the other terminal. With the above-described procedures, the terminals are notified of the change in communication hold time during communication by the scatternet.

With the above-described arrangement and control, the apparatus of this embodiment, which belongs to a plurality of networks, can ensure a band necessary for each network by assigning a slot in accordance with the state of each application without any overlap of slots assigned to the networks. For this reason, optimum assignment can dynamically be implemented in correspondence with a change in application state. In addition, slots can be assigned to the plurality of networks without forming a free slot. That is, efficient communication can be implemented.

The information terminal of this embodiment controls the band of each network by giving the parameters about the communication hold time to each terminal, as described above. This indicates that the communication timing of each network is adjusted, and information about the communication timing determined by the adjustment is given to each network.

Second Embodiment

This embodiment has the same arrangement as the first embodiment except that an operation state table 901a shown in FIG. 9A is used in place of the operation state definition table 204a shown in FIG. 6A, and a communication hold parameter table 901b shown in FIG. 9B is used in place of the communication hold parameter table 204b shown in FIG. 6B. When the tables are changed, the processing contents also change, as a matter of course. This embodiment will be described below by exemplifying a case wherein a change in communication condition during communication between an information terminal 101 and an access point 102 and printer 103 is monitored on the basis of the type of transfer data, and communication hold times to be given to the access point 102 and printer 103 are appropriately set and given in accordance with the change in condition, thereby performing communication while optimizing the communication resources of the information terminal 101. The communication hold time assignment method in forming a scatternet is the same as in the first embodiment, and a description thereof will be omitted. The procedures of communication hold time change processing by the information terminal 101 during communication by the scatternet will be described with reference to FIG. 4. Several processes will be described here with reference to FIG. 4 as in the first embodiment, though the trigger to change the communication hold time is different.

<Communication Hold Time Change Processing Based on Data Type>

This communication hold time change processing is triggered by the start of communication by the scatternet. A case wherein communication hold time change processing is executed by using the type of transfer data as a communication condition will be described first.

In step S401, a state monitor unit 203 of the information terminal 101 collects the type of data to be transferred in communication by the scatternet. In this step, the state monitor unit 203 can collect the operation state either by periodically issuing an acquisition request of the type of data to be transferred to each communication device or by causing the information terminal 101 to notify the state monitor unit 203 of, e.g., the start of data transfer. The information terminal 101 determines the data type on the basis of a Bluetooth profile used in each network. The Bluetooth profile is a protocol defined for each device (the access point and printer in the example in FIG. 1) and is determined in accordance with a network device used by an application executed by the information terminal 101. For example, if the printer 103 is to execute printing, a printing profile is used. If image data is to be read out from the access point, a basic imaging profile is used. When the printing profile is used, the data to be transferred can be determined as print data. When the basic imaging profile is used, the data to be transferred can be determined as a thumbnail file. The data type can be determined on the basis of the Bluetooth profile in this way. However, this is a mere example. For example, the application may notify the state monitor unit 203 of the type of data to be transferred. Alternatively, the state monitor unit 203 may monitor the name of the file to be transferred and read the file extension (only when the file structure of the information terminal 101 can cope with it) to determine the data type. In, e.g., Windows®, a file extension indicates the type of file. Hence, the data type can be determined on the basis of the value of the file extension.

In step S402, the information terminal 101 compares the operation state collected in step S401 with an operation state precedingly collected and stored in a data management unit 204 to determine whether the type of transfer data has changed. For example, when the state has changed because the information terminal 101 accesses a Web page through the access point 102 and starts downloading a file or because print data transfer processing starts from the idle state in communication with the printer 103, the collected operation state is stored in the data management unit 204, and the flow advances to step S403. Otherwise, the collected operation state is stored in the data management unit 204, and the flow returns to step S401.

In step S403, the information terminal 101 executes communication hold time adjustment processing of determining new communication hold times of the access point 102 and printer 103. The communication hold time adjustment processing will be described later in detail.

In step S404, the information terminal 101 executes communication hold time notification processing of notifying the access point 102 and printer 103 of the new communication hold times determined in step S403. The communication hold time notification processing will be described later in detail.

After notifying each terminal of the communication hold time in this step, the flow returns to step S401 to monitor the operation state of the application.

<Adjustment of Communication Hold Time>

Figure 8:
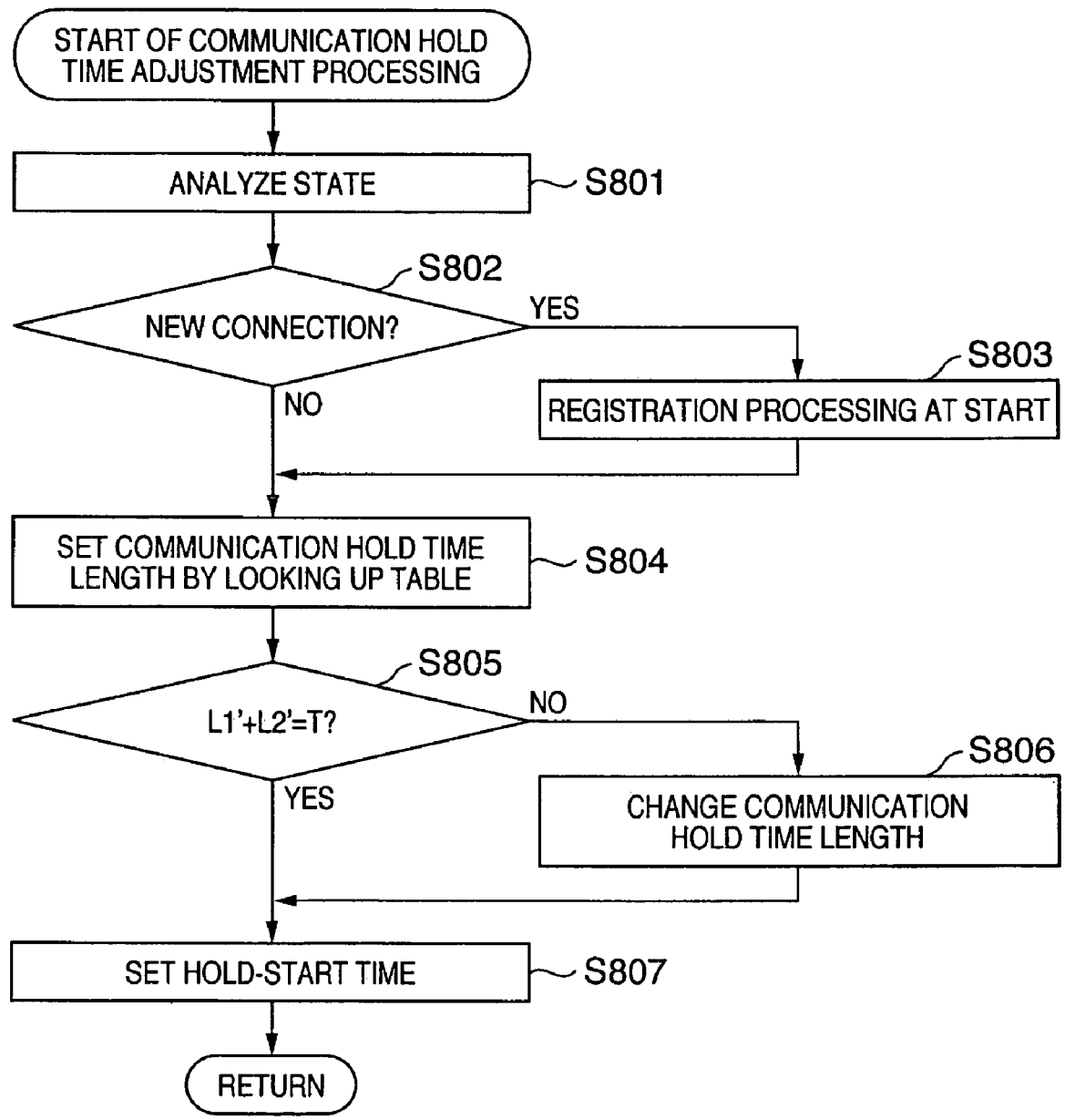
FIG. 8 is a flowchart showing communication hold time adjustment processing procedures according to the second embodiment.

The procedures of communication hold time adjustment processing by the information terminal 101 will be described next with reference to FIG. 8. In step S801, a communication hold time adjustment unit 202 acquires the operation state of the application with a change in its operation state from the data management unit 204 and analyzes the operation state.

In step S802, the communication hold time adjustment unit 202 determines whether a new registered terminal with a change in operation state is present. If YES in step S802, the flow advances to step S803. Otherwise, the flow advance to step S804.

In step S803, the communication hold time adjustment unit 202 registers the specific ID information (terminal ID such as address information) of the partner communication device to be newly registered, with which communication has newly started, in the communication hold parameter table 901b of the data management unit 204 as a communication condition monitor terminal. A communication hold time length L is also registered in accordance with the operation state of the terminal (the type of data to be transmitted/received). The communication hold time length corresponding to the data type is acquired by looking up the operation state table 901a. The data type can be determined in accordance with, e.g., the application to be executed. If data type notification is done in the process of establishing the communication channel before data transfer, or the data type is determined in accordance with the protocol, the type of data to be transferred can be determined before data transfer.

FIG. 9A shows an example of the operation state table 901a. The specific ID information (terminal ID) and communication condition (the data type in FIG. 9A; FIG. 9A shows a case wherein a change in communication condition is detected on the basis of the type of data to be transferred, though the criterion to be applied changes depending on the determination condition in this region) of each terminal and the corresponding communication hold time length L are registered in the operation state table 901a. The remaining fields are determined in step S807. The terminal ID need not always be registered in the operation state table 901a. In this example, the data type is registered for each terminal ID.

In the operation state table 901a shown in FIG. 9A, the value of the communication hold time length L is registered as a ratio to a communication hold time period T which is defined as 1. In this embodiment, when the criterion to determine the communication condition is, e.g., the type of transfer data, and the transfer data is "document file (DOC file)", the communication hold time length L is registered as 0.01 because a communication band as wide as possible is preferably obtained. When "Null data" is to be transferred, the application only needs to ensure a communication band to hold the communication channel. Hence, the communication hold time length L is registered as 0.95. Similarly, in the communication condition to the printer in this embodiment, the communication hold time length L is registered as 0.01 because a communication band as wide as possible is preferably obtained. For "status signal" for printer state notification or "Null data" to hold the communication channel, the application only needs to ensure a communication band to transmit/receive data in a very small amount. Hence, the communication hold time length L is registered as 0.95.

If data to be transferred is, e.g., audio data (not shown) which requires communication at a relatively short period, the communication hold time period T can be set short. The values shown in FIG. 9A are mere examples. The category of data types or definition corresponding to the category can be changed variously. In this case, however, the communication hold time length L is set short when a wide communication band is necessary or long when a narrow communication band suffices.

If the criterion to determine the communication condition is a data amount, the communication band to be ensured is determined by dividing a specific data amount in a specific range, and the communication hold time length L capable of ensuring the band is registered. In this embodiment, the communication hold time length L to be registered has been described as if it were a fixed value. However, when, e.g., traffic is used as the criterion to determine the communication condition, i.e., when the condition does not always take a predetermined value, the value of the period L to be registered can be changed as needed.

FIG. 9B shows an example of the communication hold parameter table 901b. The data type, communication hold time length, communication hold time period, and hold start times are registered in the communication hold parameter table 901b in association with a terminal ID. This table is updated dynamically and updated to contents corresponding to the operation state in accordance with the procedures shown in FIG. 8.

In step S804, the communication hold time adjustment unit 202 sets, in the communication hold parameter table 901b, a new communication hold time length L1' or L2' of the access point 102 (i.e., a piconet 111) or printer 103 (i.e., a piconet 112), which corresponds to the current application operation state, by looking up the operation state table 901a.

In step S805, the communication hold time adjustment unit 202 calculates the sum of the communication hold time lengths L1' and L2' and determines whether the value equals the communication hold time period T. If NO in step S805, the flow advances to step S806. Otherwise, the flow advances to step S807.

In step S806, the communication hold time adjustment unit 202 changes the communication hold time length such that the sum of communication hold time lengths L1' and L2' equals the communication hold time period T. In this embodiment, the end of one communication hold time synchronizes with the start of the other communication hold time, as shown in FIG. 3 or 7. For this reason, the relationship between the communication hold time lengths L1' and L2' and the communication hold time period after adjustment is given by L1'+L2'=T (=1). In step S806, the values of the communication hold time lengths L1' and L2' registered in the communication hold parameter table 901b are adjusted so that the condition is satisfied. Which communication hold time length is to be changed and adjusted can be determined in accordance with the same procedures as in the first embodiment.

In step S807, the communication hold time adjustment unit 202 sets the newly set communication hold time lengths L1" and L2" in the communication hold parameter table 901b and stores them in the data management unit 204. That is, the communication hold time period T is unchangeable in this embodiment. The periods and starts of the communication hold times of the respective networks synchronize with each other. For these reasons, if the communication hold time length is changed, the hold start time must also be changed. When the hold start time of one network is used as a reference (called a reference side), and the time on the reference side is to be changed, only the communication hold time length is changed. The hold start time need not be changed. When the other time not on the reference side is to be changed, the communication hold time length is changed, and the hold start time is shifted by an amount corresponding to the change. For example, when the communication hold time length is changed, the hold start time is advanced by the prolonged time. Either communication hold time can be used as the reference. More specifically, let L1' be the hold time before adjustment, and L1" be the hold time after adjustment in step S806. In this case, if the hold start time of the communication hold time to be changed is defined as T1, the hold start time after adjustment can be expressed by T1−(L1"−L1').

Then, communication hold time notification processing in step S404 is activated to transfer the hold start time, communication hold time period, and communication hold time length as the changed communication hold time parameters to the terminals (i.e., the access point 102 and printer 103) of the networks connected to the information terminal 101 to request the communication hold time notification processing, thereby ending the communication hold time adjustment processing. The notification is sent to the terminal whose communication hold time parameters are changed.

The communication hold time adjustment processing will be described in detail. For example, assume that the type of transfer data from the information terminal 101 to the printer 103 changes from "status signal" to "print data", and the type of data to be transferred to the access point is "Null data". In this case, in the communication hold time adjustment processing, the communication hold time adjustment unit 202 sets the new communication hold time length L1' of the access point 102 to 0.95 and the new communication hold time length L2' of the printer 103 to 0.01 in step S804 by looking up the operation state table. Since the sum of L1' and L2' is smaller than 1 in step S805, the flow advances to step S806 to change the value L2' to 0.05 so that the sum of the communication hold time lengths L1' and L2' equals 1. In step S807, the communication hold time adjustment unit 202 sets new hold start times for the access point 102 and printer 103 on the basis of the set communication hold time lengths L1' and L2' under a condition that one of the terminals is in the communication hold time at any timing of the communication hold time period T and transfers the new communication hold time parameters of the terminals to the communication hold time notification processing. In step S805 of the above-described detailed example, the value L2' is changed in accordance with the set value "0.95" of L1'. Instead, the value L1' may be changed to 0.99 in accordance with the set value "0.01" of L2'. Alternatively, the value L1' may be changed to, e.g., 0.97, and the value L2' may be changed to 0.03. With the above-described procedures, the communication hold time is adjusted.

As described above, in the system in which one communication device is connected to a plurality of networks to communicate with them, a means for adjusting the communication hold time between each network and the common communication terminal which communicates with each network and notifying the partner device of the communication hold time is provided. Hence, the limited communication band can efficiently be distributed to the plurality of devices. In addition, to determine the communication hold time, a means for monitoring the data type as a communication condition to be transferred between the communication devices and, when a change in condition, i.e., a change in data type is detected, switching the communication hold time assignment to each device which has been adapted sequentially in accordance with the change is provided. With this arrangement, fine control can be done by, e.g., assigning a wide communication band to a device after file transfer from another device is ended. Hence, more efficient communication band distribution can be implemented.

Third Embodiment

In this embodiment, instead of using the operation state definition table 204a shown in FIG. 6A, a communication hold time is determined on the basis of a transfer data amount, and the remaining communication hold parameters are determined or adjusted on the basis of the determined communication hold time. In this embodiment, a change in communication condition during communication between an information terminal 101 and an access point 102 and printer 103 is monitored on the basis of the transfer data amount, and communication hold times to be given to the access point 102 and printer 103 are appropriately set and given in accordance with the change in condition, thereby performing communication while optimizing the communication resources of the information terminal 101. The communication hold time assignment method in forming a scatternet is the same as in the first embodiment, and a description thereof will be omitted. The procedures of communication hold time change processing by the information terminal 101 during communication by the scatternet will be described with reference to FIG. 4. Several processes will be described here with reference to FIG. 4 as in the first embodiment, though the trigger to change the communication hold time is different.

<Communication Hold Time Change Processing Based on Transfer Data Amount>

A case wherein communication hold time change processing is executed by using a transfer data amount as a communication condition will be described next with reference to FIG. 4. In step S401, a state monitor unit 203 of the information terminal 101 collects the amount of data to be transferred in communication by the scatternet. In this step, the state monitor unit 203 can collect the operation state by periodically issuing an acquisition request of the amount of data to be transferred to each communication device. Alternatively, the state monitor unit 203 may acquire the transfer data amount by causing the information terminal 101 to notify the state monitor unit 203 of, e.g., the amount of data to be transferred (e.g., the file capacity or number of files) in advance at the start of data transfer. The information terminal 101 acquires the data amount from the file capacity or the number of files received from the application using each network before data transfer. The value is transferred to the state monitor unit 203.

In step S402, the information terminal 101 compares the operation state collected in step S401 with an operation state precedingly collected and stored in a data management unit 204 to determine whether the amount of transfer data has changed. For example, when the state has changed because the information terminal 101 accesses a Web page through the access point 102 and starts downloading a file to change small data transfer to large data transfer or because print data transfer processing starts from a printer status information transfer state in the idle state in communication with the printer 103, and data in a large quantity is transferred, the collected operation state is stored in the data management unit 204 (a communication hold parameter table which is different from the communication hold parameter table 901b in FIG. 9B in that a data amount is registered in the operation state field), and the flow advances to step S403 in which the same processing as described above is executed to determine and adjust a communication hold time length L corresponding to the data amount at that time. Otherwise, the collected operation state is stored in the data management unit 204, and the flow returns to step S401. The data amount may change in every data transfer. In addition, the band width need not always be changed immediately when the data amount varies slightly. For example, a threshold value may be set in the data amount variation value, and it may be determined that the data amount has changed when a variation of a predetermined value or more is detected.

Figure 4:
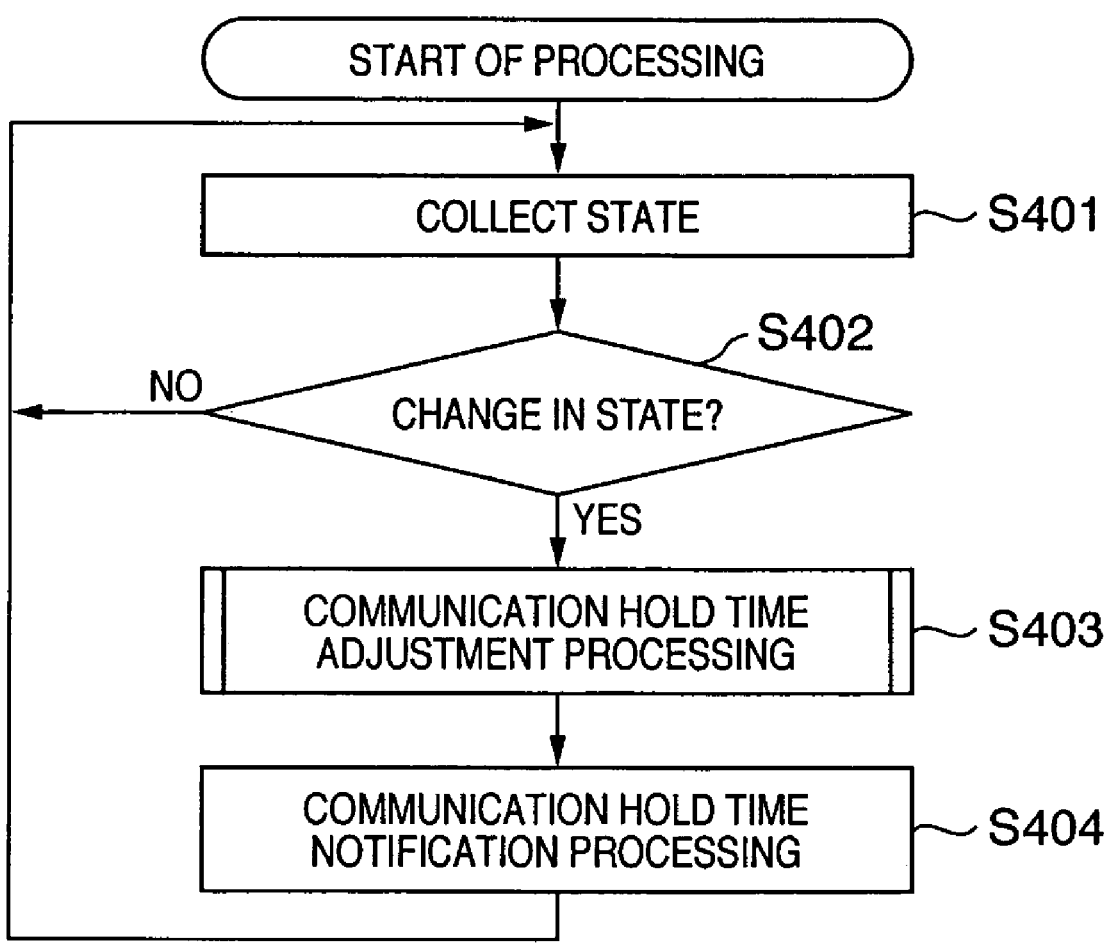
FIG. 4 is a flowchart showing communication hold time change processing procedures according to the embodiment.

The processing in step S403 in FIG. 4 is the same as in the second embodiment except that the operation state table 901a in FIG. 9A is not used to determine the communication hold time length. Instead, a table which associates the communication hold time length with not the data type but the data amount is used. Step S404 is also the same as in the second embodiment.

As described above, in the system in which one communication device is connected to a plurality of networks to communicate with them, a means for adjusting the communication hold time between each network and the common communication terminal which communicates with each network and notifying the partner device of the communication hold time is provided. Hence, the limited communication band can efficiently be distributed to the plurality of devices. In addition, to determine the communication hold time, a means for monitoring the data amount as a communication condition to be transferred between the communication devices and, when a change in condition, i.e., a change in data amount is detected, switching the communication hold time assignment to each device which has been adapted sequentially in accordance with the change is provided. With this arrangement, fine control can be done by, e.g., assigning a wide communication band to a device after file transfer from another device is ended. Hence, more efficient communication band distribution can be implemented.

Fourth Embodiment

In this embodiment, instead of using the operation state definition table 204a shown in FIG. 6A, a communication hold time is determined on the basis of the control state of a communication partner device in each network, and the remaining communication hold parameters are determined or adjusted on the basis of the determined communication hold time. In this embodiment, a change in communication condition during communication between an information terminal 101 and an access point 102 and printer 103 is monitored on the basis of the control state of the partner device, and communication hold times to be given to the access point 102 and printer 103 are appropriately set and given in accordance with the change in condition, thereby performing communication while optimizing the communication resources of the information terminal 101. The communication hold time assignment method in forming a scatternet is the same as in the first embodiment, and a description thereof will be omitted. The procedures of communication hold time change processing by the information terminal 101 during communication by the scatternet will be described with reference to FIG. 4. Several processes will be described here with reference to FIG. 4 as in the first embodiment, though the trigger to change the communication hold time is different.

<Communication Hold Time Change Processing Based on Device Control State>

A case wherein communication hold time change processing is executed by using a control state from or to a partner device as a communication condition will be described next with reference to FIG. 4. In step S401, a state monitor unit 203 of the information terminal 101 collects the control state information of the partner device of communication by the scatternet. In this step, the state monitor unit 203 can collect the operation state by periodically issuing an acquisition request of control state information of each communication device. Alternatively, the state monitor unit 203 may acquire the control state information by causing the information terminal 101 to notify the state monitor unit 203 of, e.g., the communication condition in control information transfer processing from or to the communication partner device.

In step S402, the information terminal 101 compares the operation state collected in step S401 with an operation state precedingly collected and stored in a data management unit 204 to determine whether the control state has changed. For example, when the state has changed because the information terminal 101 accesses, through the access point 102, a network camera 104 arranged on the network and temporarily acquires the control right of the panhead of the network camera 104, the collected operation state (i.e., the control state information of the partner device) is stored in the data management unit 204, and the flow advances to step S403 to execute the same processing as described above. Otherwise, the collected operation state is stored in the data management unit 204, and the flow returns to step S401.

The processing in step S403 in FIG. 4 is the same as in the second embodiment except that the operation state table 901a in FIG. 9A is not used to determine the communication hold time length. Instead, a table which associates the communication hold time length with not the data type but the control state information of the partner device is used. Step S404 is also the same as in the second embodiment.

As described above, in the system in which one communication device is connected to a plurality of networks to communicate with them, a means for adjusting the communication hold time between each network and the common communication terminal which communicates with each network and notifying the partner device of the communication hold time is provided. Hence, the limited communication band can efficiently be distributed to the plurality of devices. In addition, to determine the communication hold time, a means for monitoring the control state of the partner device as a communication condition to be transferred between the communication devices and, when a change in condition, i.e., a change in control state of the partner device is detected, switching the communication hold time assignment to each device which has been adapted sequentially in accordance with the change is provided. With this arrangement, fine control can be done by, e.g., assigning a wide communication band to a device when control of another device is started. Hence, more efficient communication band distribution can be implemented.

Fifth Embodiment

In this embodiment, instead of using the operation state definition table 204a shown in FIG. 6A, a communication hold time is determined on the basis of the communication traffic of each network, and the remaining communication hold parameters are determined or adjusted on the basis of the determined communication hold time. In this embodiment, a change in communication condition during communication between an information terminal 101 and an access point 102 and printer 103 is monitored on the basis of the communication traffic, and communication hold times to be given to the access point 102 and printer 103 are appropriately set and given in accordance with the change in communication traffic, thereby performing communication while optimizing the communication resources of the information terminal 101. The communication hold time assignment method in forming a scatternet is the same as in the first embodiment, and a description thereof will be omitted. The procedures of communication hold time change processing by the information terminal 101 during communication by the scatternet will be described with reference to FIG. 4. Several processes will be described here with reference to FIG. 4 as in the first embodiment, though the trigger to change the communication hold time is different.

<Communication Hold Time Change Processing Based on Traffic>

A case wherein communication hold time change processing is executed by using a change in traffic as a communication condition will be described next with reference to FIG. 4. In step S401, a state monitor unit 203 of the information terminal 101 collects information of communication traffic by the scatternet. In this step, the state monitor unit 203 can collect the operation state by periodically issuing a request for acquiring the information of communication traffic to each communication device. Alternatively, the state monitor unit 203 may acquire the information of communication traffic by causing the information terminal 101 to notify the state monitor unit 203 of, e.g., the communication condition when traffic to the communication partner device has changed. The information terminal 101 counts, e.g., the number of packets exchanged with each network and calculates the number of packets per unit time. In this case, the state monitor unit 203 is notified of the calculated number of packets per unit time. A change in traffic may be detected on the basis of busy information which is received when the reception buffer of the communication partner device is full. In this case, the number of packets need not be counted, and the state monitor unit 203 is notified of the reception of busy information. In counting the number of packets per unit time, a slight variation is negligible. Hence, a threshold value may be set in the variation amount, and it may be determined that the state has changed when a variation of a predetermined value or more is detected.

In step S402, the information terminal 101 compares the operation state collected in step S401 with an operation state precedingly collected and stored in a data management unit 204 to determine whether the traffic has changed. For example, when the reception buffer of the printer 103 temporarily becomes full during print data transfer between the information terminal 101 and the printer 103, and the traffic decreases and the state changes because a status signal representing the busy state is received, the collected operation state is stored in the data management unit 204, and the flow advances to step S403 to execute the same processing as described above. Otherwise, the collected operation state is stored in the data management unit 204, and the flow returns to step S401. With the above procedures, the communication hold time is changed.

The processing in step S403 in FIG. 4 is the same as in the second embodiment except that the operation state table 901a in FIG. 9A is not used to determine the communication hold time length. Instead, a table which associates the communication hold time length with not the data type but the traffic is used. Step S404 is also the same as in the second embodiment. If the monitor target is the buffer full information of the partner device, a table in which a communication hold time length corresponding to the full state and communication hold times in other states are registered is used.

As described above, in the system in which one communication device is connected to a plurality of networks to communicate with them, a means for adjusting the communication hold time between each network and the common communication terminal which communicates with each network and notifying the partner device of the communication hold time is provided. Hence, the limited communication band can efficiently be distributed to the plurality of devices. In addition, to determine the communication hold time, a means for monitoring the traffic of each network as a communication condition to be transferred between the communication devices and, when a change in condition, i.e., a change in traffic is detected, switching the communication hold time assignment to each device which has been adapted sequentially in accordance with the change is provided. With this arrangement, fine control can be done by, e.g., assigning a narrow communication band to a device with heavy traffic. Hence, more efficient communication band distribution can be implemented.

In the embodiments of the present invention, Bluetooth is used as the local radio commutation scheme. However, the present invention can be applied not only to Bluetooth but also to a communication scheme such as wireless LAN which allows connection to a plurality of networks by sharing one node of networks and also allows time-divisional participation in the plurality of networks by causing the common node to notify the plurality of networks of communication timings.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application Nos. 2004-359125 and 2004-359126 both filed on Dec. 10, 2004, which are hereby incorporated by reference herein.

What is claimed is:

1. A communication apparatus, comprising:
a processor implementing the following units;
a monitor unit that monitors communication conditions with a plurality of networks;
a setting unit that performs adjusting and setting a communication timing to communicate with each of the plurality of networks in accordance with the communication condition of each network and notifying the plurality of networks of information about the set communication timings, wherein the communication timing includes a communication hold time period, a hold start time and a communication hold time length in the communication hold time period; and
a communication unit that switches communication to each of the plurality of networks on the basis of the setting of the communication timings,
wherein said setting unit dynamically adjusts the communication timing on the basis of the communication condition monitored by said monitor unit, and
wherein the communication hold time periods set to respective networks are synchronized with one another and the communication hold time lengths assigned to respective networks are changed in accordance with communication statuses of respective networks, wherein when a device of a communication partner requires predetermined band guarantee, said setting unit sets the communication timing of each network so as to maintain a band of the network to which the device is connected.

2. The apparatus according to claim 1, wherein said setting unit sets the communication timing of each network without any overlap of communication hold times of the plurality of networks and any overlap of communication participation times of the plurality of networks.

3. The apparatus according to claim 1, wherein said monitor unit monitors a type of data to be transferred as the communication condition, and said setting unit sets the communication timing of each network in accordance with the type of data to be transferred.

4. The apparatus according to claim 1, wherein said monitor unit monitors an amount of data to be transferred as the communication condition, and said setting unit sets the communication timing of each network in accordance with the amount of data to be transferred.

5. The apparatus according to claim 1, wherein said monitor unit monitors a control state of a device of a communication partner as the communication condition, and said setting unit sets the communication timing of each network in accordance with the control state of the device of the communication partner.

6. The apparatus according to claim 1, wherein said monitor unit monitors traffic to a communication partner as the communication condition, and said setting unit sets the communication timing of each network in accordance with the traffic to the communication partner.

7. A control method of a communication apparatus, comprising:
a monitor step of monitoring communication conditions with a plurality of networks; a setting step of adjusting and setting a communication timing of the communication apparatus to communicate with each of the plurality of networks in accordance with the communication condition of each network and notifying the plurality of networks of information about the set communication timings, wherein the communication timing includes a communication hold time period, a hold start time and a communication hold time length in the communication hold time period; and a communication step of switching communication to each of the plurality of networks on the basis of the setting of the communication timings, wherein in the setting, step, the communication timing is dynamically adjusted on the basis of the communication condition monitored in the monitor step, and wherein the communication hold time periods set to respective networks are synchronized with one another and the communication hold time lengths assigned to respective networks are changed in accordance with communication statuses of respective networks, wherein when a device of a communication partner requires predetermined band guarantee, said setting unit sets the communication timing of each network so as to maintain a band of the network to which the device is connected.

8. A computer program embodied in a non-transitory computer readable storage medium, said program causing a computer to execute a control method according to claim 7.

9. A non-transitory computer-readable recording medium recording a computer program according to claim 8.

10. The apparatus according to claim 1, wherein said setting unit adjusts and sets the communication hold time to inhibit communication with each of a plurality of networks as the communication timing; and notifies each of the plurality of networks of the communication hold time, and wherein said communication unit stops communication with each networks on the basis of the setting of the communication hold time.

11. The apparatus according to claim 10, wherein said setting unit sets the communication hold time of the network in accordance with an operation state of an application program as the communication condition.

12. The apparatus according to claim 11, further comprising an operation state table in which the operation state of the application program which is being executed and the communication hold time corresponding to the operation state are registered in association with each other, wherein said setting unit sets the communication hold time on the basis of the operation state of the application program and the operation state table.

13. A communication network system including a communication apparatus of according to claim 10.

14. The control method according to claim 7, a wherein said setting step adjusts and sets the communication hold time to inhibit communication of the communication apparatus with each of a plurality of networks as the communication timing and notifies each of the plurality of networks of the communication hold time; and said communication step stops the communication with each network on the basis of the setting of the communication hold time.

15. A computer program embodied in a non-transitory computer readable storage medium, said program causing a computer to execute a control method according to claim 14.

16. A non-transitory computer-readable recording medium recording a computer program of claim 15.

* * * * *